M. J. FLYNN.
COOKING UTENSIL.
APPLICATION FILED MAR. 7, 1914.

1,112,281.

Patented Sept. 29, 1914.
2 SHEETS—SHEET 1.

Witnesses
R. F. Maryman
H. Hagelberstein

Inventor
M. J. Flynn
By N. Randolph Jr.
Attorney

M. J. FLYNN.
COOKING UTENSIL.
APPLICATION FILED MAR. 7, 1914.

1,112,281.

Patented Sept. 29, 1914.
2 SHEETS—SHEET 2.

Inventor
M. J. Flynn.

UNITED STATES PATENT OFFICE.

MARTIN J. FLYNN, OF PORTSMOUTH, VIRGINIA.

COOKING UTENSIL.

1,112,281.  Specification of Letters Patent.  Patented Sept. 29, 1914.

Application filed March 7, 1914. Serial No. 823,200.

*To all whom it may concern:*

Be it known that I, MARTIN J. FLYNN, a citizen of the United States, residing at Portsmouth, in the county of Norfolk and State of Virginia, have invented certain new and useful Improvements in Cooking Utensils; and I do hereby declare the following to be a full, clear, and exact description of the invention, such as will enable others skilled in the art to which it appertains to make and use the same.

This invention relates to new and useful improvements in cooking utensils, and has for its principal object to provide a device which is particularly adapted for use on board ship and the like where it is necessary that quantities of food be cooked at the same time.

Another object of the invention is to provide an electrically operated cooking utensil which may be easily and quickly heated without requiring any great amount of time.

A still further object of this invention is to provide a device having an attachment by means of which the heat may be regulated to remove any danger of burning of the food which is being cooked.

A still further object of the invention is to provide a device having a hand attachment by means of which a small portion of food may be cooked when it is so desired.

Still another object of the invention is to provide a hoist by means of which the container for the food which is being cooked may be raised and carried to the desired point without causing inconvenience to the user.

Figure 1:
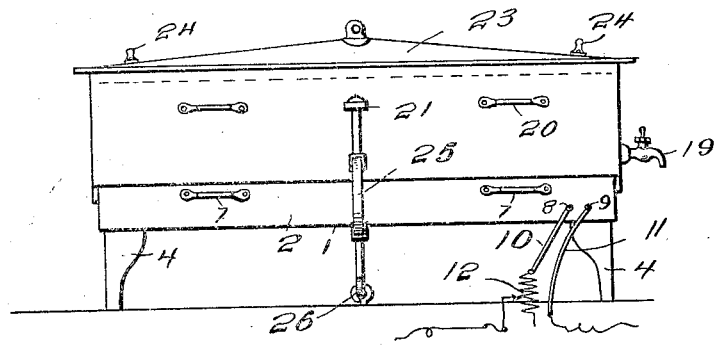
Figure 2:
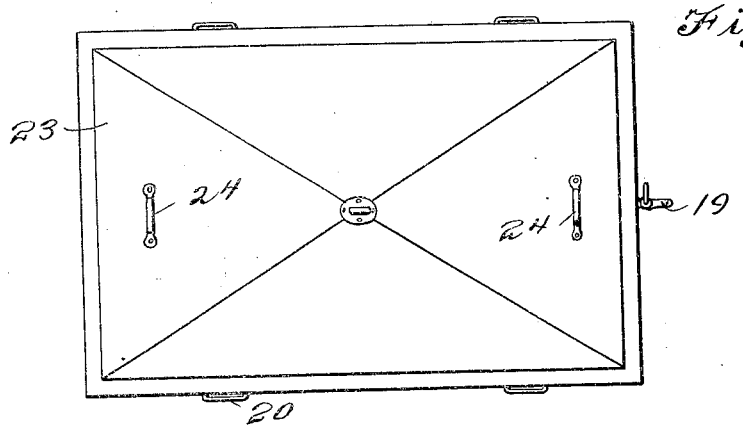
Figure 6:
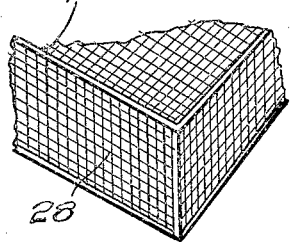
Figure 5:
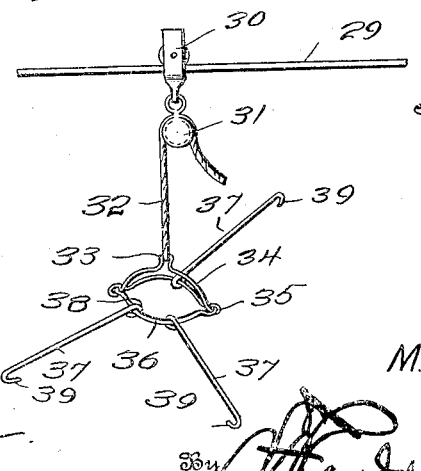
Figure 3:
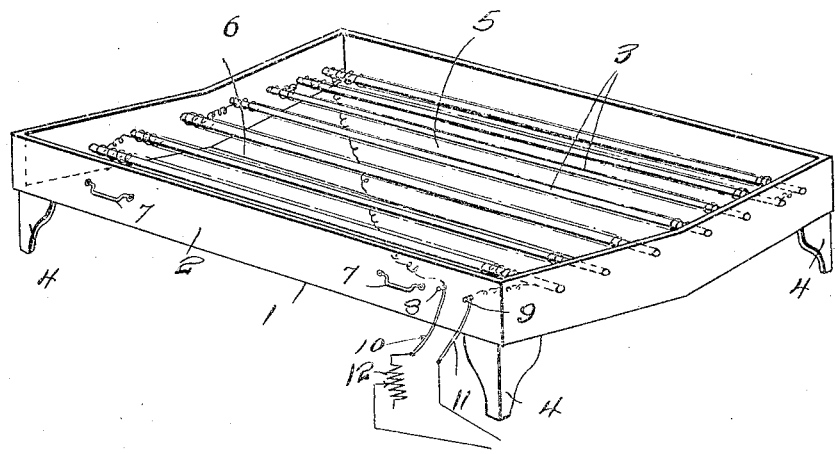
Figure 4:
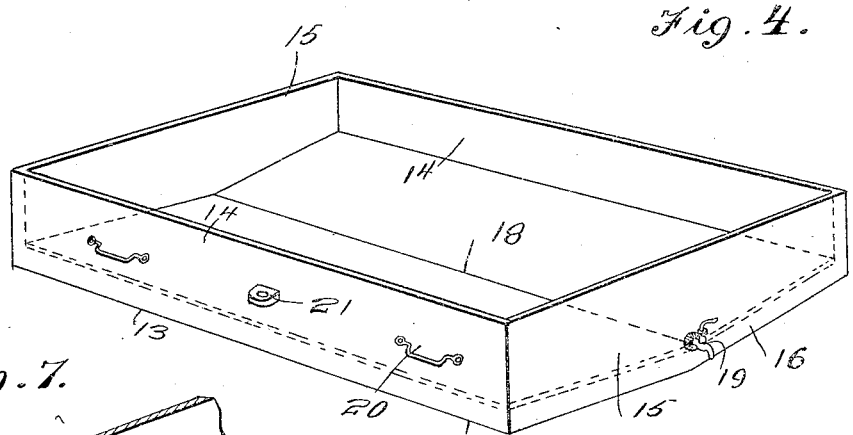
Figure 7:
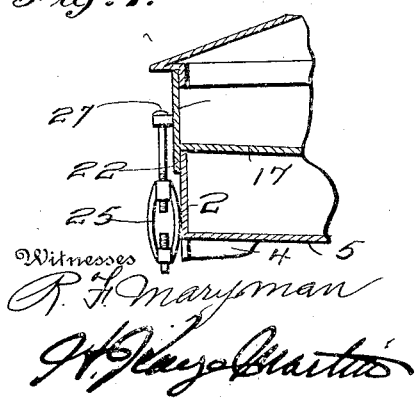

With these and other objects in view, the invention consists in the novel combination and arrangement of parts which will be fully set forth in the following specification and accompanying drawings, in which, Figure 1 is a side view in elevation of a cooker constructed in accordance with this invention, Fig. 2 is a top plan view of Fig. 1, Fig. 3 is an enlarged detail perspective view of the device showing the containers for the food which is being cooked, removed, Fig. 4 is a view similar to Fig. 3 of the container, Fig. 5 is a detail view of the mechanism for lifting the basket which is arranged to fit the container, therefrom, Fig. 6 is an enlarged detail view of a fragment of the basket, and Fig. 7 is an enlarged fragmentary view of the cooker showing the method of securing the same to the deck of the vessel upon which the device is being used.

Referring now to the drawings by characters of reference, the numeral 1 designates as an entirety a heating element forming a portion of this device which comprises the frame 2 supporting the insulating bars 3. These bars 3 are preferably of an insulating material and are wound with the usual resistance coils which are arranged to become heated and thereby heat the device. The legs 4 are secured to each corner of the heating element 1 and are arranged to hold the same away from the platform upon which it is supported. A suitable bottom 5 is formed in the heating element and is secured to the frame by its lower edges, said bottom being provided with the longitudinally extending central channel 6 which is arranged to drain the device when it is so desired. The inner surfaces of the frame 2 and the bottom 5 are preferably lined with porcelain or a similar material which is capable of resisting the action of the heat and throwing the same up against the bottom of the kettle which will be more fully hereinafter described. Secured to the sides of the frame at suitable intervals are provided the handles 7 by means of which the device may be lifted and carried to the desired point.

Suitable electrical connections 8 and 9 are carried by the frame and are operatively connected with the coils of wire which are wound upon the bars 3. These electrical connections are provided with the wires 10 and 11 which are connected in any suitable manner to a power source by means of which the device is put in operation. A suitable rheostat or similar controlling device is provided in one of the wires and is designated generally by the numeral 12, said controlling device being arranged to control the flow of current through the heating element so as to eliminate any danger of burning the food which is being cooked when the device is in use.

The cooking vessel above referred to, is generally designated by the numeral 13 and comprises the side walls 14 and end walls 15. The end walls 15 are provided at their lower edges with the angular portions 16 which are arranged so that their apexes are centrally of the side walls 14 as clearly illustrated in Fig. 4. A suitable bottom 17 is secured to the walls in any suitable manner and is arranged to form the trough 18 by means of which the device may be drained. This trough 18 is in direct alinement with the apexes of the angular portions of the walls 15 and one of the walls 15 is provided with the spigot or draining tap 19 by means of which any liquid within the receptacle may be drawn off without moving the device from its position on the heating element above referred to. Suitable handles 20 are secured to the sides of the receptacle and are arranged to provide hand holds by means of which the device may be lifted from its position on the heating element when it is so desired. Secured to the side walls 14 intermediate their longitudinal extremities are provided the ears 21, the use of which will appear as the description proceeds. Formed integral with the side walls 14 and end walls 15 are provided the downwardly extending flanges which overlie the upper edge of the heating element and form a guard therefor which will prevent any undesired material from entering the heating element when the device is in use.

A suitable cover element 23 is provided and is arranged to seat upon the top of the cooking vessel to prevent the escape of the steam therefrom and thereby materially assist in the cooking of the food placed therein. This cover element is provided near each end with the handle members 24 by means of which the same may be lifted from its position on the top of the cooking vessel and thereby leave the contents thereof uncovered. In order to secure the cooking vessel in place on the heating element, there is provided a suitable turn-buckle 25, one end of which is connected to the floor or deck according to where the device is used, as at 26 and the opposite end of said turn-buckle is provided with the head 27 which abuts the ears 22 formed on the side walls 14 of the receptacle 13, and when said turn-buckle is tightened, it will be evident that the receptacle 13 will be firmly held in position on the heating element.

A suitable basket which is formed of wire or similar material is provided and is arranged to fit within the cooking utensil so that the contents thereof may be removed in a single operation. In order to provide for the removal of the basket and the shifting of the same to the desired point, there is provided the track 29, upon which the trolley 30 is arranged to run. This trolley 30 is provided with the pulley 31 over which the rope or hoisting cord 32 is adapted to pass, as clearly shown in Fig. 5. Connected to the lower end of the rope 32 as at 33 is provided the bail 34, the free ends of which are connected as at 35 to the ring 36 carrying the arms 37 which are secured to said ring as at 38. The free ends of the arms 37 are bent back upon themselves as at 39 to form the hooks which are arranged to engage the upper edge 40 of the basket 28, above referred to.

It will be apparent from the foregoing that in use, the heating element is placed in the desired position and the connections 8 and 9 connected to any suitable source of power supply. Upon turning the current into the device, it will be evident that the heating coils wound upon the bars 3, will become heated and when the receptacle 13 is placed in position on the heating element it will be evident that the contents of said receptacle will be affected by the heat of the coils and any food placed therein will become cooked. The heat may be controlled through the medium of the rheostat 12 and it will be apparent that a sharp or slow heat may be produced by means of which the food may be cooked slowly or quickly at the desire of the user. The spigot or drain tap 19 is provided to draw off any excess liquid which may gather in the receptacle 13 and in this way it will be evident that the contents of the receptacle may be entirely removed without removing the device from its position on the heating element. When it is so desired the basket 28 may be placed in position within the receptacle and the food stuff which is to be cooked may be placed therein, and after the process of cooking, the hoisting device may be secured to the basket and the whole raised and shifted to the desired point where the continuation of the preparation of the food stuff may be accomplished.

While in the foregoing there has been shown and described the preferred embodiment of this invention, it is to be understood that such changes may be made in the combination and arrangement of parts as will fall within the spirit and scope of the invention as claimed.

Having thus described my invention, I claim:

1. In a device of the character described, the combination with an electrical heating element, a receptacle, said receptacle being provided with a central longitudinal trough, a drain tap at one end of the receptacle and located at the lower extremity of the trough to drain the receptacle, means to anchor the receptacle in place on the heating element and means to control the flow of current through the heating element and thereby control the heat generated thereby.

2. In a device of the character described the combination with a heating element comprising a plurality of insulated bars, heating coils wound on said bars, and means to control the flow of electrical current through the heating coils, and thereby control the heat generated therein, of a receptacle having a centrally located, longitudinally extending drain trough, a drain tap at one end of the drain trough, and a turnbuckle to removably secure the receptacle in position on the heating element.

In testimony whereof I affix my signature in presence of two witnesses.

MARTIN J. FLYNN.

Witnesses:
NICH CRARANTU,
OTTO H. CRONACHER.

Copies of this patent may be obtained for five cents each, by addressing the "Commissioner of Patents, Washington, D. C."